Aug. 17, 1965  R. O. FERGUSON  3,201,046
INSULATED RAIL JOINT CONSTRUCTION
Filed Feb. 29, 1960  2 Sheets-Sheet 1

INVENTOR.
RANDON O. FERGUSON

Aug. 17, 1965   R. O. FERGUSON   3,201,046
INSULATED RAIL JOINT CONSTRUCTION
Filed Feb. 29, 1960   2 Sheets-Sheet 2
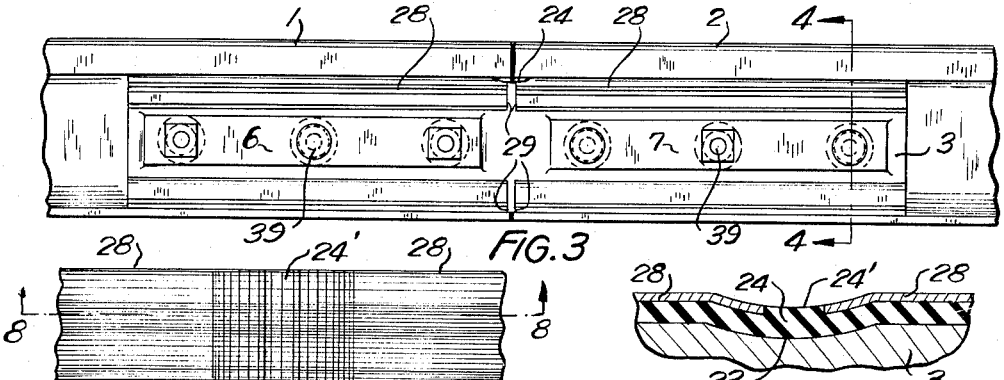
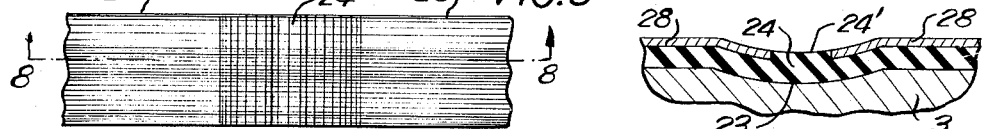
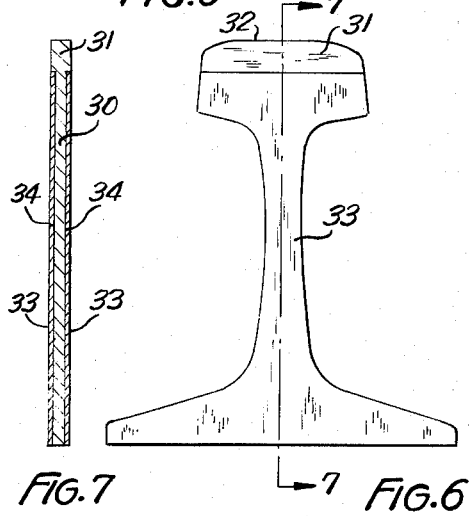
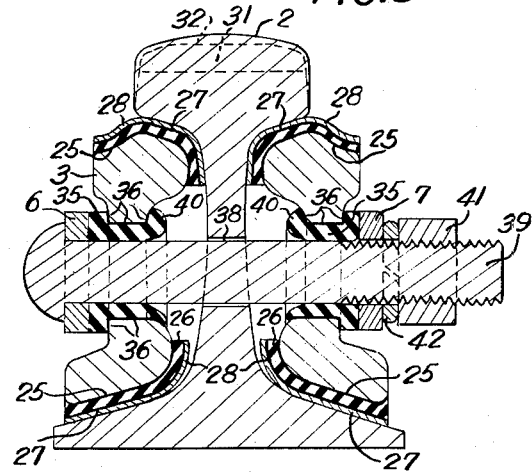
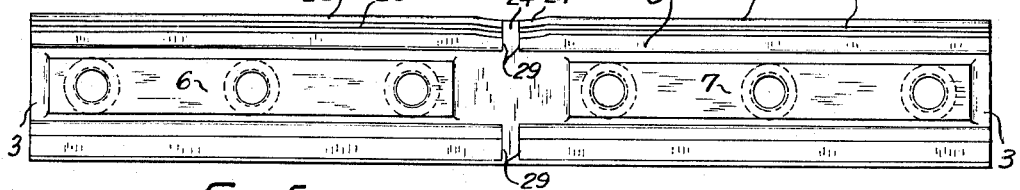
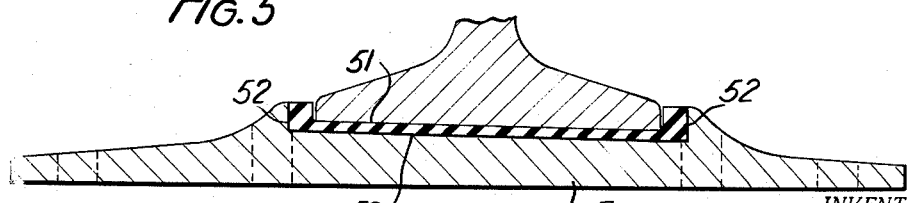
INVENTOR.
RANDON O. FERGUSON
BY
Arthur H. VanHorn
ATTORNEY

United States Patent Office 3,201,046
Patented Aug. 17, 1965

3,201,046
INSULATED RAIL JOINT CONSTRUCTION
Randon O. Ferguson, Park Forest, Ill., assignor to The Johnson Rubber Company, Middlefield, Ohio, a corporation of Ohio
Filed Feb. 29, 1960, Ser. No. 11,685
2 Claims. (Cl. 238—152)

My invention is an improvement in insulated rail joints and more particularly is concerned with the insulated rail joints of the bonded type.

Many attempts have been made heretofore to construct an insulated rail joint designed to eliminate breakage, loosening, disintegration and deterioration of the insulation material due to constant sharp blows and jars in use and further to eliminate the entry and accumulation of water and foreign particles in broken or loose insulation members or parts thereof, thus destroying effective insulating characteristics of the insulation joint and resulting in costly and extensive repairs, but so far as I have found, the results which have been sought have not been accomplished with a high degree of effectiveness or satisfaction, such as would impart long useful life to this type of rail joint comparable to the useful life of uninsulated rail joints.

It is therefore an object of the present invention to provide an insulated rail joint in which creeping or slippage of the insulation material is prevented.

Another object of the invention is to eliminate the use of adhesives or cements in securing the insulation material to the metal surfaces of the joint bars, washer plates and the like comprising the joint.

A further object of the invention is to intimately bond the insulation material to the bars and washer plates.

Another object of the invention is to clad the outer surface of the insulation material with a protection strip or layer of sheet steel which is intended to be normally in contact with the base and head portions of the rail ends and in which the sheet, layer or strip is intimately bonded to the insulation material.

Another object of the invention is to provide, as a unit, a rail joint bar to which insulation material is intimately bonded along the upper and lower portions of the bar without the use of adhesive or cement.

A still further object is to reduce the number of parts in an insulated rail joint, thus increasing the ease with which the insulated joint may be assembled and, at the same time, reducing the time required to assemble the joint.

Another object is to provide a washer plate having an insulation layer intimately bonded thereto and having integral bushings of insulating material projecting therefrom to receive the joint bar bolts.

Another object of the invention is to utilize an insulating material including an elastomeric rubber or rubber-like compound having desirable characteristics for the purpose intended, molded and intimately bonded to the surfaces of the joint bar and/or to a surface of the washer plate.

A still further object of the invention is to provide an insulated rail joint of the type disclosed which possesses better structural and flexural characteristics and which will resist abrasion, moisture, grease, shock, jar and other destructive factors commonly encountered, thereby assuring a long useful life in service with less track maintenance.

Other objects and advantages of the invention will become more apparent from the following description in which reference is made to the accompanying drawings forming a part of this application and in which like reference characters are employed to designate like parts throughout the same.

In the drawings:

FIGURE 3 is a side elevational of an insulated rail joint construction constituting a second embodiment of my invention;

FIGURE 4 is an enlarged transverse section taken on line 4—4 of FIGURE 3;

FIGURE 5 is a side elevation of an assembled insulated joint bar and washer plates illustrating an easement area located for bridging the adjacent ends of the joined rails;

FIGURE 6 is a side elevation of a metal clad insulation insert member to be assembled between the adjacent rail ends;

FIGURE 7 is a section on line 7—7 of FIGURE 6;

FIGURE 8 is a section taken on line 8—8 of FIGURE 9 illustrating the easement area;

FIGURE 9 is a fragmentary top plan view of the easement area; and

FIGURE 10 is a transverse section through a tie plate having insulation bonded to the inner surfaces of the rail seat to prevent electrical bridging of the rail ends when the tie plate comes at this location.

Figure 1:
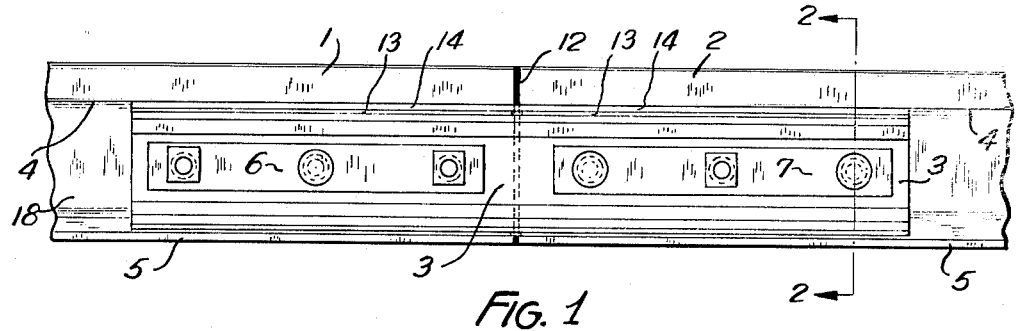
FIGURE 1 is a side elevation of a rail joint embodying my invention and shows the adjacent ends of two rail sections which are to be joined together.
Figure 2:
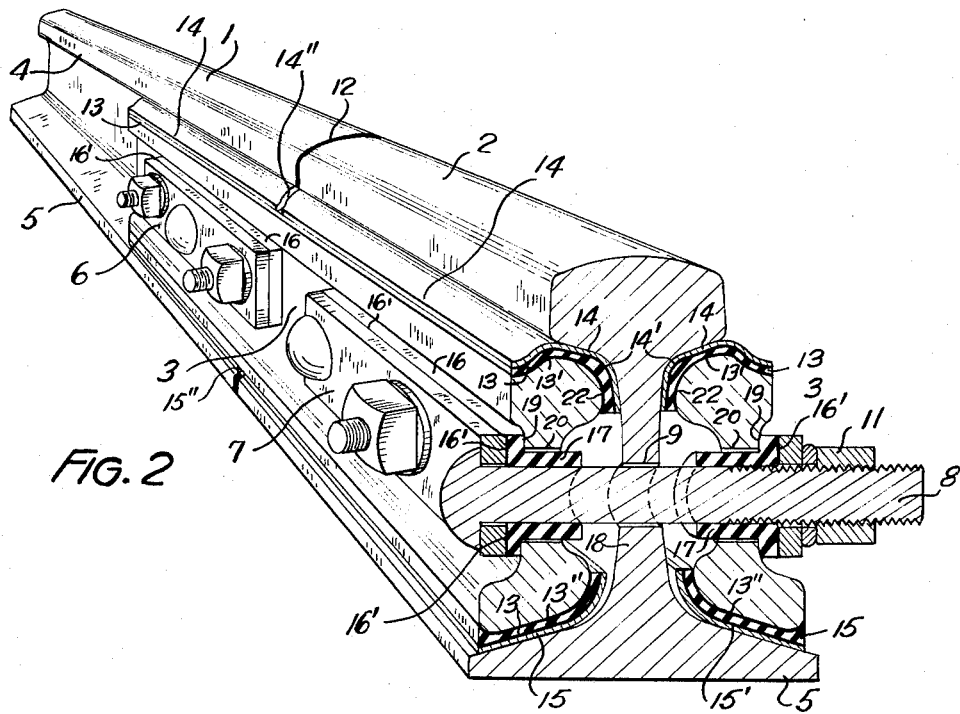
FIGURE 2 is a perspective view shown partly in section which is taken on line 2—2 of FIGURE 1.

In carrying out my invention as illustrated in the embodiment shown in FIGURES 1 and 2 of the drawing, the adjacent aligned ends of the rails 1 and 2 are joined together by joint bars 3 insulated from the fishing surfaces of the rail heads 4 and the base flanges 5. The insulated joint bars are secured in place by a pair of longitudinally spaced apart washer plates 6 and 7 and the bolts 8 which pass through openings 9 in the rails and through the insulated washer plates and the joint bars and secured in place by spring washers and nuts 10 and 11, respectively.

A filler section or end post of insulation material is interposed between the adjacent ends of the rails 1 and 2 and is indicated at 12. Preferably the insulation material of the end post 12 is of the same insulation compound as that which is bonded to the joint bars and washer plates.

Referring more particularly to FIGURE 2, the joint bars 3 have a thickness of insulation material which preferably consists of a neoprene base rubber gum compound molded and intimately bonded to the top and bottom fishing surfaces of the joint bars as at 13′ and 13″, respectively. This layer of insulation is indicated at 13 and extends preferably throughout the top and bottom fishing surfaces of the joint bar between the bar and the rail ends. A sheet of steel 14 is bonded at 14′ throughout its inner surface to the outer surfaces of the insulation material 13 to engage the under surface of each rail head 4 and a similar steel strip or sheet 15 is likewise bonded at 15′ to the outer surface of the insulation material which, as previously stated, is molded and bonded to the lower fishing surface of the bar. The respective metal sheets 14 and sheets 15 are longitudinally spaced apart at their adjacent ends as at 14″ and 55″ at the rail ends to prevent metallic bridging of the rail ends.

The washer plates 6 and 7 each comprises an outer metal plate to which the insulation 16 is molded and bonded to the inner surfaces of the bars throughout as at 16′. The insulation members 16 are formed with integral thimbles or bushings 17 extending toward the web portion 18 of the rails and which are apertured to receive the shanks of the bolts 8. The insulation 16 which is molded and bonded to the inner face of the washer plates and which is preferably coextensive with these plates engages the outer face 19 of the joint bar, as indicated in FIGURE 2, the inwardly projecting thimbles or bushings 17 preferably extending through the openings 20. The openings 20 are of a diameter which allows the washer plates to easily be assembled and disassembled with respect to the joint bars.

From the above, it will be seen that the entire joint assembly, exclusive of spring washers, bolts and nuts, comprises only seven units or pieces.

The insulation material bonded to the upper fishing surfaces of the joint bars may be extended over and down the outside face thereof and may be relatively less thick than that as shown bonded to the upper and fishing surfaces of the joint bars, or that intimately bonded to the washer plates since these thin portions are not subjected to the heavy loads to which the remaining insulation may be exposed.

The insulated joint bars, metal clad as at 14 and 15, have the advantage of resisting abrasion and consequent undesirable wear upon the insulation but they provide increased flexural and bearing strength.

The insulation end post at 12 separating the adjacent rail ends of the joint not only fills the gap between these ends, but increases the support given the insulation and steel at the rail ends, thereby resisting rail end wear and permitting heavy loads to be carried smoothly over the joint, and thereby providing an extended useful life to the complete joint.

By protecting the bonded insulation as at 14 and 15 by bonding it to the sheet metal cladding members and by bonding the insulation along its inner surfaces to the joint bars and by thus keeping the bearing pressures away from the longitudinal edges of the members 14 and 15, the load is distributed over a greater area of insulation, thus also accommodating greater loads by decreasing the bearing stresses and pressure on the insulation at a critical point. This also results in containment of the insulation in position to effectively increase its load carrying ability.

Insulated rail joints made in accordance with my invention have been tested in a 33 in. stroke rolling load machine using a 44,000 lb. test load applied on a 36 in. span to give 400,000 in. lb. bending moment. Outside of this support, the joint was subjected to a reversed bending moment of 200,000 in. lb. in each cycle. This is the load comparable to tests on 115 lb. joint bars and is about a 50% greater wheel load than the largest found in actual service. One of the first tests was run over a period of about a month in which 502,000 cycles of loading were accumulated. Although a progressive fracture through one of the joint bars developed, this life was considerably more than obtained with tests of previous insulated joint designs in general use.

In a subsequent test which included a joint constructed as illustrated in the drawing and which included an insulation filling 12 interposed between the adjacent ends of the joined rails 1 and 2, it was found that where the joint was subjected to some 2,000,000 cycles over a period of about four months, no failure had occurred. In this test an easement at the adjacent rail ends was provided as will be described hereinafter.

In both tests, the electrical resistance between the rail ends was between 10,000 megohms and infinity, and the load carrying smoothness of the joint was not impaired.

By molding and bonding the insulation to the parts as indicated above, ingress of water, oil and foreign substances between the metal surfaces and the insulation is prevented. Furthermore, by such a structure, greater strength and protection is given to the insulation and is over an extremely long extended useful life of the joint, as compared with types of insulated joints wherein the insulation is applied to the metal surfaces by adhesive or cement. In such cases, there is not afforded sufficient resistance to wear and the effects of water and oil because the use of cement or adhesive does not effect a permanent bond between the insulation and the metal but merely serves as an initial means of securing the two materials together. When exposed to ordinary loads, these structures will disintegrate and will have a much shorter useful life than joints made in accordance with my invention.

In FIGS. 3 to 8, inclusive, I have shown an insulated rail joint construction of preferred form and design.

More particularly in FIGURE 3, the rails 1 and 2 are shown in aligned end-to-end relation and the unitized insulated joint bars 3 are applied one on each side of the respective rail web portions adjacent the rail ends to be joined. The washer plates 6 and 7 are insulated from the joint bars and rail sections and the entire assembly is secured together by means of bolts, nuts and spring lock washers.

According to my invention, a joint bar easement is provided at the adjacent rail ends in the joint by forging a relief or depression area in the joint bars at their mid sections, as at 23. This relief area is covered by the layer of insulation which is bonded to the joint bars, as at 24, and extends upwardly between the spaced adjacent ends of the metal cladding 28 as at 24'. By such means, the rail end bearing is taken away from the top or abrasion surface of the joint bars at the rail end area and will result in decreased bearing pressure and stresses on the insulation at this somewhat critical location. By such a construction, the useful life of the rail joint and the component parts thereof will be increased materially under heavy load conditions.

As will be seen from the illustration, the joint bars 3 overlie the adjacent rail ends along the rail web portions and on the opposite sides thereof. The joint bars are each provided along their longitudinal top and bottom bearing surfaces with a suitable insulation layer which is permanently bonded to these surfaces, as indicated at 25. As shown in FIGURE 4, this insulation material extends inwardly from the outer exposed top and bottom portions of the bar toward the adjacent rail sections and thence over the bearing surfaces of the bar and over the inner rounded portions thereof, as at 26. These insulation layers are permanently bonded directly to the steel bar throughout the contacting surfaces of the insulation with the bars.

Substantially coextensive with and permanently bonded to the outer surfaces of the insulation layers, as at 27, are spaced metal clad members 28, preferably formed of sheet steel, and which are shaped to the contour of the insulation layers bonded to the joint bars. This is clearly shown in FIGURE 4 of the drawings.

Thus the major areas of the upper metal clad members 28 along their outer surfaces are contoured for intimate contact with the under fishing surfaces of the rail below the rail head and for a limited distance downwardly along the rail web, while the spaced lower metal clad members 28 have their outer surfaces throughout the major portion thereof in contact with the inclined upper surface of the rail base.

It will be noted in FIGURES 3 and 5 that the metal clad insulation layers, both along the top and bottom portions of the joint bars, are separated by a gap, as at 29, which spans the opposed rail ends.

The rails 1 and 2 are separated from each other by a steel clad end post formed of suitable insulation material and which is shown in detail in FIGURES 6 and 7. The end post comprises a body 30 of suitable insulation material which is preferably in sheet form and which is shaped as in FIGURE 6 to the end cross section of the rails. The head or upper portion of the body 30 is indicated at 31 and its upper surface 32, when the end post is assembled between the adjacent rail ends, lies below the tread surface of the rails, as shown in dotted lines in FIGURE 4.

Extending from the bottom of the end post and along opposite sides of the insulation body 30 are strips of steel 33 which are shaped to the contour of the end post and which are permanently bonded to the insulation body 30 throughout their contacting surfaces with the body, as at 34. The body 30 below the head portion is recessed with respect to the head so that when the metal clad members 33 are in assembled position, as shown in FIGURE 7, the over-all thickness of the end post throughout its length is substantially the same as that of the head portion 31.

In order to insure complete and proper insulation between the joint bars and the rail sections, as well as with the washer plates, I have provided a thickness of suitable insulation material indicated at 35 which is molded to the joint bars and permanently bonded thereto, as indicated at 36, and which has portions which extend through the bolt holes 37 formed in the joint bars in alignment with the rail openings 38 for receiving the bolts 39, the shanks of which pass through the washer plates 6 and 7, the joint bars and the rail itself. The insulation members 35 are coextensive with the washer plates 6 and 7 and have cylindrical portions projecting through the openings in the joint bars and which terminate between the rail web and the inner portion of the joint bars in a portion overlapping the inner faces of the joint bars adjacent each of the bolt openings therein, as indicated at 40. The bolts 39 are secured in place by means of nuts 41 and the spring lock washers 42.

In FIGURE 10, I have illustrated how, in accordance with my invention, the rail base may be supported in tie plates, as indicated at 50 and which is insulated therefrom by means of a suitable insulation 51 which is bonded, as at 52, to the bottom and side surfaces of the recess formed in the tie plates.

From the drawings, and from the above description, it will be observed that by my invention I have provided means whereby an effective insulated rail joint construction for sectionalizing railroad signals which possesses the added desirable characteristics of providing abrasion resistance and increased flexural and bearing strength in the joint is obtained. Furthermore, it will be noted that an insulated rail joint made in accordance with my invention constitutes a structure comprising a minimum number of essential parts which results in lower labor costs in manufacture and assembly of the joint and in maintenance at the site of installation.

Furthermore, by my invention, the useful life of the insulated joint is extended beyond other types of insulated rail joints with which I am familiar, and by providing a steel clad insulation molded and bonded to the joint bars wherein the armor is in intimate contact with the upper and lower fishing surfaces of the rails, the insulation is, by virtue of this armor, adequately protected against stresses and thus resists abrasion of the insulation under load conditions. The bearing strength is also materially increased by such means.

The provision of an easement area, as indicated at 23 and 24, takes the rail end bearing away from the spaced ends of the clad or armor on the tops of the bars. This also decreases the bearing pressure and stresses at a somewhat critical point in the joint. Thus, the load is distributed over a greater area of insulation which, because of this unique construction, insures confinement of insulation on all sides throughout the bearing area.

Various changes may be made in the details of construction and arrangement of parts of the invention without departing from the spirit thereof or the scope of the appended claims.

I claim:

1. In an insulated rail joint, a pair of rails positioned in spaced end-to-end relation each formed with diverging laterally extending fishing surfaces, a rigid joint bar formed with opposed load bearing surfaces and non-load bearing surfaces adjacent thereto, electric insulation formed of deformable material molded and permanently bonded to said joint bar along said opposed load bearing surfaces and said non-load bearing surfaces adjacent thereto, horizontally aligned bearing sheaths formed of sheet metal spaced apart at their inner ends to provide a gap at the location of the space between said rail ends, said sheaths being permanently bonded to said electric insulation along load bearing and along related non-load bearing surfaces, and fastening means electrically insulated from said joint bar pressing said load bearing surfaces toward said fishing surfaces causing tight engagement between said sheath and said fishing surfaces and producing pressures in said electric insulation along said load bearing surfaces greater than the pressure in said electric insulation along said non-load bearing surfaces, said gap preventing electrical continuity between said sheaths, the electric insulation extending along said non-load bearing surfaces providing containment of the electric insulation along said load bearing surfaces by virtue of its bonded relationship with said joint bar and bearing sheath.

2. In an insulated rail joint, a pair of rails positioned in a spaced end-to-end relationship, each formed with diverging laterally extending fishing surfaces, a rigid joint bar formed with opposed load bearing surfaces and non-load bearing surfaces adjacent thereto, electric insulation formed of deformable elastomeric rubber-like material molded and permanently bonded to said joint bar along said opposed load bearing surfaces and along said non-load bearing surfaces adjacent thereto, a pair of aligned bearing sheaths formed of sheet metal permanently bonded to said electric insulation along load bearing and along related non-load bearing surfaces, and fastening means electrically insulated from said joint bar pressing said load bearing surfaces toward said fishing surfaces causing tight engagement between said sheaths and said fishing surfaces and producing pressure in said electric insulation along said load bearing surfaces greater than the pressure in said electric insulation along said non-load bearing surfaces, said sheaths being spaced from each other providing a gap adjacent to the ends of said rails, the electrical insulation extending along said non-load bearing surfaces providing containment of the eletcrical insulation extending along said load bearing surfaces by virtue of its bonded relationship with said joint bar and bearing sheaths.

References Cited by the Examiner

UNITED STATES PATENTS

| 1,320,573 | 11/19 | Roach | 238—159 |
| 1,320,712 | 11/19 | Schermerhorn | 238—155 |
| 1,962,708 | 6/34 | Caruthers | 238—243 |
| 2,172,929 | 9/39 | Backes | 238—243 |
| 2,441,329 | 5/48 | Payne | 238—155 |
| 2,670,136 | 2/54 | Moses | 238—155 |
| 2,989,240 | 6/61 | Lansing | 238—244 |

FOREIGN PATENTS

| 618,758 | 2/49 | Great Britain. |
| 726,310 | 3/55 | Great Britain. |

ARTHUR L. LA POINT, *Primary Examiner.*

LEO QUACKENBUSH, JAMES S. SHANK, *Examiners.*